US012679561B2

(12) United States Patent
J et al.

(10) Patent No.:  US 12,679,561 B2
(45) Date of Patent:          Jul. 14, 2026

(54) FLIGHT SAFETY OPERATIONS OPTIMIZATION

(71) Applicant: Honeywell International Inc., Charlotte, NC (US)

(72) Inventors: Kirupakar J, Madurai (IN); Kalimulla Khan, Bangalore (IN); Ramkumar Rajendran, Madurai (IN); Shirish Katti, Bangalore (IN); Mahima Banerjee, Bangalore (IN); Rohit Pandita, Pune (IN); Jyothsna Peram, Srikalahasti (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/818,803

(22) Filed: Aug. 29, 2024

(65) Prior Publication Data

US 2025/0091730 A1          Mar. 20, 2025

(30) Foreign Application Priority Data

Sep. 19, 2023    (IN) .............................. 202311062992

(51) Int. Cl.
B64F 5/60          (2017.01)
G06N 20/00       (2019.01)
G07C 5/08          (2006.01)
(52) U.S. Cl.
CPC .............. B64F 5/60 (2017.01); G06N 20/00 (2019.01); G07C 5/0808 (2013.01); G07C 5/085 (2013.01)

(58) Field of Classification Search
CPC ......... B64F 5/60; G06N 20/00; G07C 5/0808; G07C 5/085; G08G 5/53; G08G 5/55; G08G 5/58; G08G 5/21
See application file for complete search history.

(56) References Cited

U.S. PATENT DOCUMENTS

| | | | |
|---|---|---|---|
| 2016/0247104 A1* | 8/2016 | Rosenfeld .......... | G06Q 10/0635 |
| 2020/0269995 A1* | 8/2020 | Beaven ................. | G07C 5/008 |
| 2020/0273350 A1* | 8/2020 | Litvova ................... | G08G 5/34 |
| 2024/0210963 A1* | 6/2024 | Stollmeyer ........ | G05B 23/0286 |

* cited by examiner

*Primary Examiner* — Aniss Chad
*Assistant Examiner* — Chase L Cooley
(74) *Attorney, Agent, or Firm* — Alston & Bird LLP

(57)          ABSTRACT

Techniques for optimizing flight safety operations for an aircraft are described. In operation, aircraft operational parameters corresponding to a plurality of flight operations are retrieved. The aircraft operational parameters are then analyzed using a first machine learning model to identify a first flight operation, where the first flight operation comprises at least one aircraft operational parameter with deviation beyond a threshold. At least one potential flight safety incident corresponding to the first flight operation is then identified using the at least one aircraft operational parameter. The at least one potential flight safety incident is then analyzed using a second machine learning model to identify a corrective action for the potential flight safety incident, where the second machine learning model is trained using flight safety artifacts comprising a plurality of flight safety incidents and corrective actions to be initiated in response to the plurality of flight safety incidents. The corrective action is then subjected to an avionics digital twin to ascertain that the corrective action mitigates the at least one potential flight safety incident. The corrective action is then recommended for the at least one potential flight safety incident.

15 Claims, 11 Drawing Sheets

FLIGHT SAFETY OPTIMIZATION SYSTEM 102

INTERACTION ENGINE 302

ANALYSIS ENGINE 304

VERIFICATION ENGINE 306

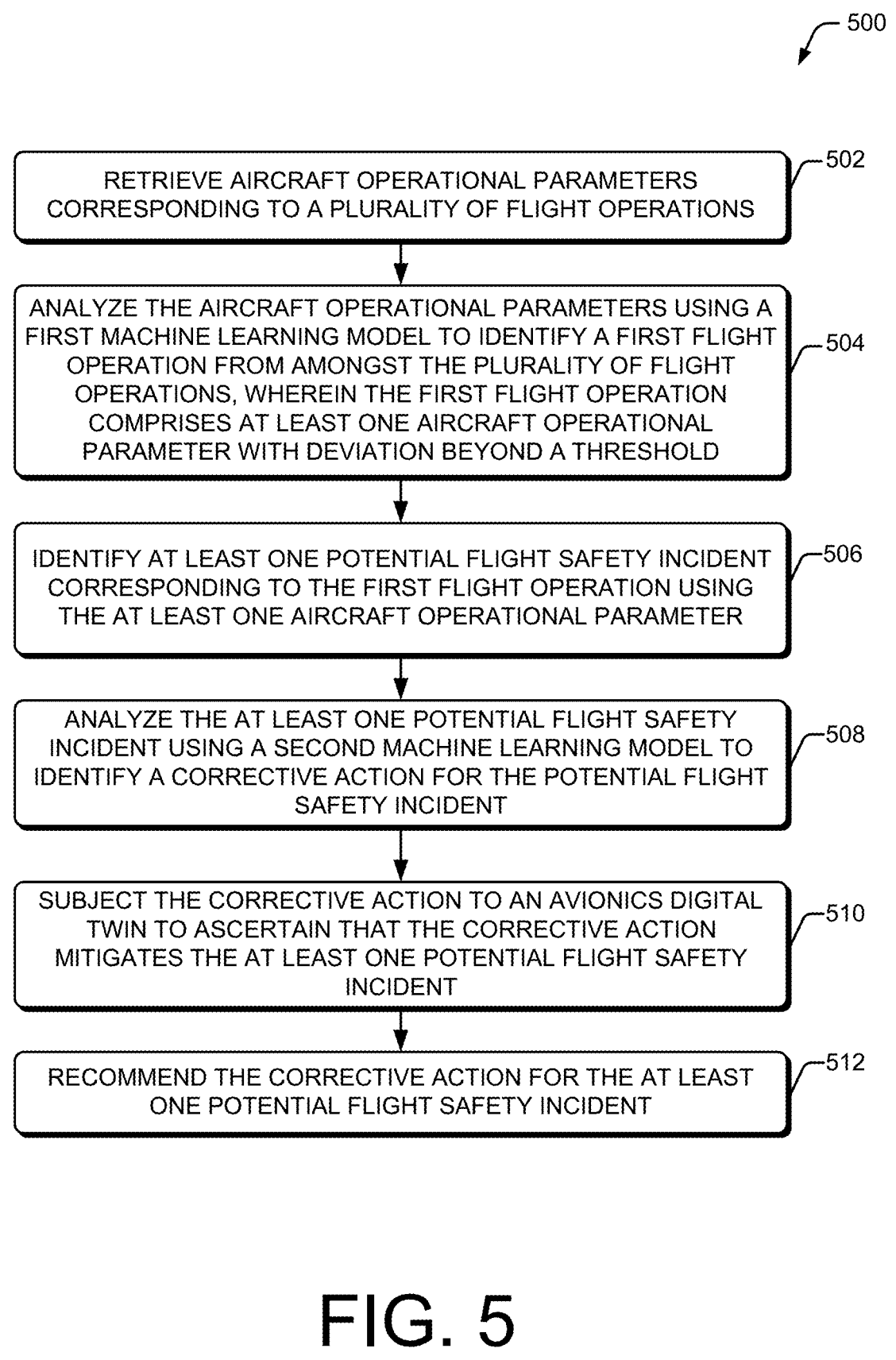

RETRIEVE AIRCRAFT OPERATIONAL PARAMETERS CORRESPONDING TO A PLURALITY OF FLIGHT OPERATIONS

504

ANALYZE THE AIRCRAFT OPERATIONAL PARAMETERS USING A FIRST MACHINE LEARNING MODEL TO IDENTIFY A FIRST FLIGHT OPERATION FROM AMONGST THE PLURALITY OF FLIGHT OPERATIONS, WHEREIN THE FIRST FLIGHT OPERATION COMPRISES AT LEAST ONE AIRCRAFT OPERATIONAL PARAMETER WITH DEVIATION BEYOND A THRESHOLD

506

IDENTIFY AT LEAST ONE POTENTIAL FLIGHT SAFETY INCIDENT CORRESPONDING TO THE FIRST FLIGHT OPERATION USING THE AT LEAST ONE AIRCRAFT OPERATIONAL PARAMETER

508

ANALYZE THE AT LEAST ONE POTENTIAL FLIGHT SAFETY INCIDENT USING A SECOND MACHINE LEARNING MODEL TO IDENTIFY A CORRECTIVE ACTION FOR THE POTENTIAL FLIGHT SAFETY INCIDENT

510

SUBJECT THE CORRECTIVE ACTION TO AN AVIONICS DIGITAL TWIN TO ASCERTAIN THAT THE CORRECTIVE ACTION MITIGATES THE AT LEAST ONE POTENTIAL FLIGHT SAFETY INCIDENT

512

RECOMMEND THE CORRECTIVE ACTION FOR THE AT LEAST ONE POTENTIAL FLIGHT SAFETY INCIDENT

FIG. 5

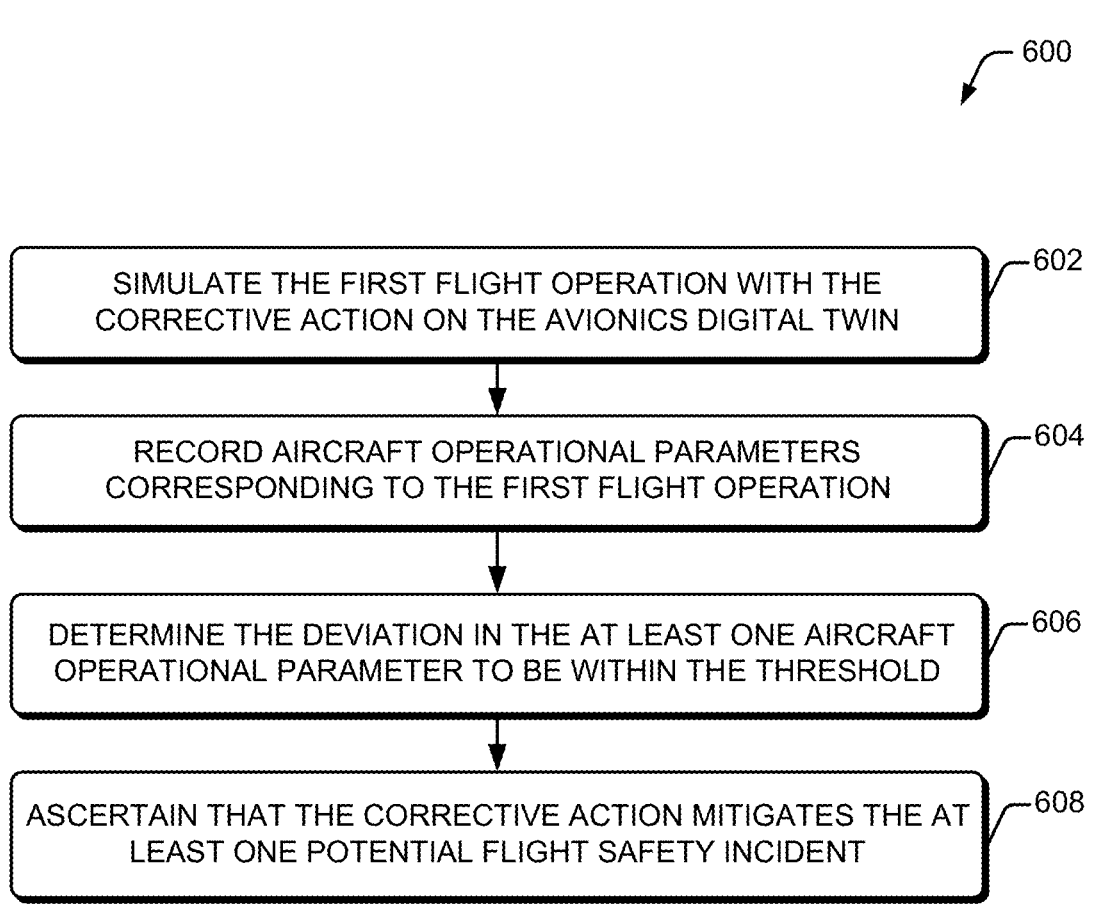

600

SIMULATE THE FIRST FLIGHT OPERATION WITH THE
CORRECTIVE ACTION ON THE AVIONICS DIGITAL TWIN ~602

RECORD AIRCRAFT OPERATIONAL PARAMETERS
CORRESPONDING TO THE FIRST FLIGHT OPERATION ~604

DETERMINE THE DEVIATION IN THE AT LEAST ONE AIRCRAFT
OPERATIONAL PARAMETER TO BE WITHIN THE THRESHOLD ~606

ASCERTAIN THAT THE CORRECTIVE ACTION MITIGATES THE AT
LEAST ONE POTENTIAL FLIGHT SAFETY INCIDENT ~608

FIG. 6

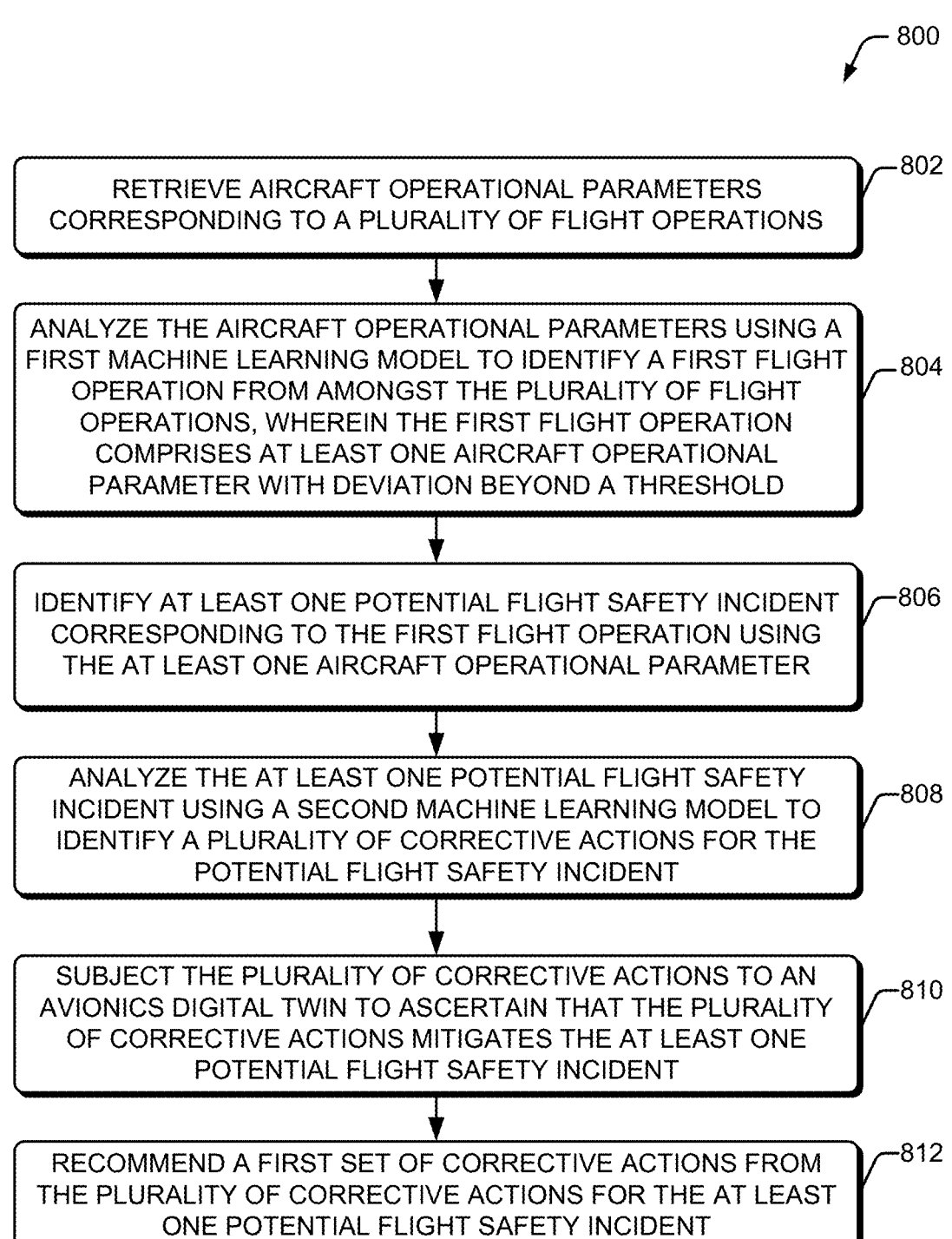

800

RETRIEVE AIRCRAFT OPERATIONAL PARAMETERS
CORRESPONDING TO A PLURALITY OF FLIGHT OPERATIONS
802

ANALYZE THE AIRCRAFT OPERATIONAL PARAMETERS USING A
FIRST MACHINE LEARNING MODEL TO IDENTIFY A FIRST FLIGHT
OPERATION FROM AMONGST THE PLURALITY OF FLIGHT
OPERATIONS, WHEREIN THE FIRST FLIGHT OPERATION
COMPRISES AT LEAST ONE AIRCRAFT OPERATIONAL
PARAMETER WITH DEVIATION BEYOND A THRESHOLD
804

IDENTIFY AT LEAST ONE POTENTIAL FLIGHT SAFETY INCIDENT
CORRESPONDING TO THE FIRST FLIGHT OPERATION USING
THE AT LEAST ONE AIRCRAFT OPERATIONAL PARAMETER
806

ANALYZE THE AT LEAST ONE POTENTIAL FLIGHT SAFETY
INCIDENT USING A SECOND MACHINE LEARNING MODEL TO
IDENTIFY A PLURALITY OF CORRECTIVE ACTIONS FOR THE
POTENTIAL FLIGHT SAFETY INCIDENT
808

SUBJECT THE PLURALITY OF CORRECTIVE ACTIONS TO AN
AVIONICS DIGITAL TWIN TO ASCERTAIN THAT THE PLURALITY
OF CORRECTIVE ACTIONS MITIGATES THE AT LEAST ONE
POTENTIAL FLIGHT SAFETY INCIDENT
810

RECOMMEND A FIRST SET OF CORRECTIVE ACTIONS FROM
THE PLURALITY OF CORRECTIVE ACTIONS FOR THE AT LEAST
ONE POTENTIAL FLIGHT SAFETY INCIDENT
812

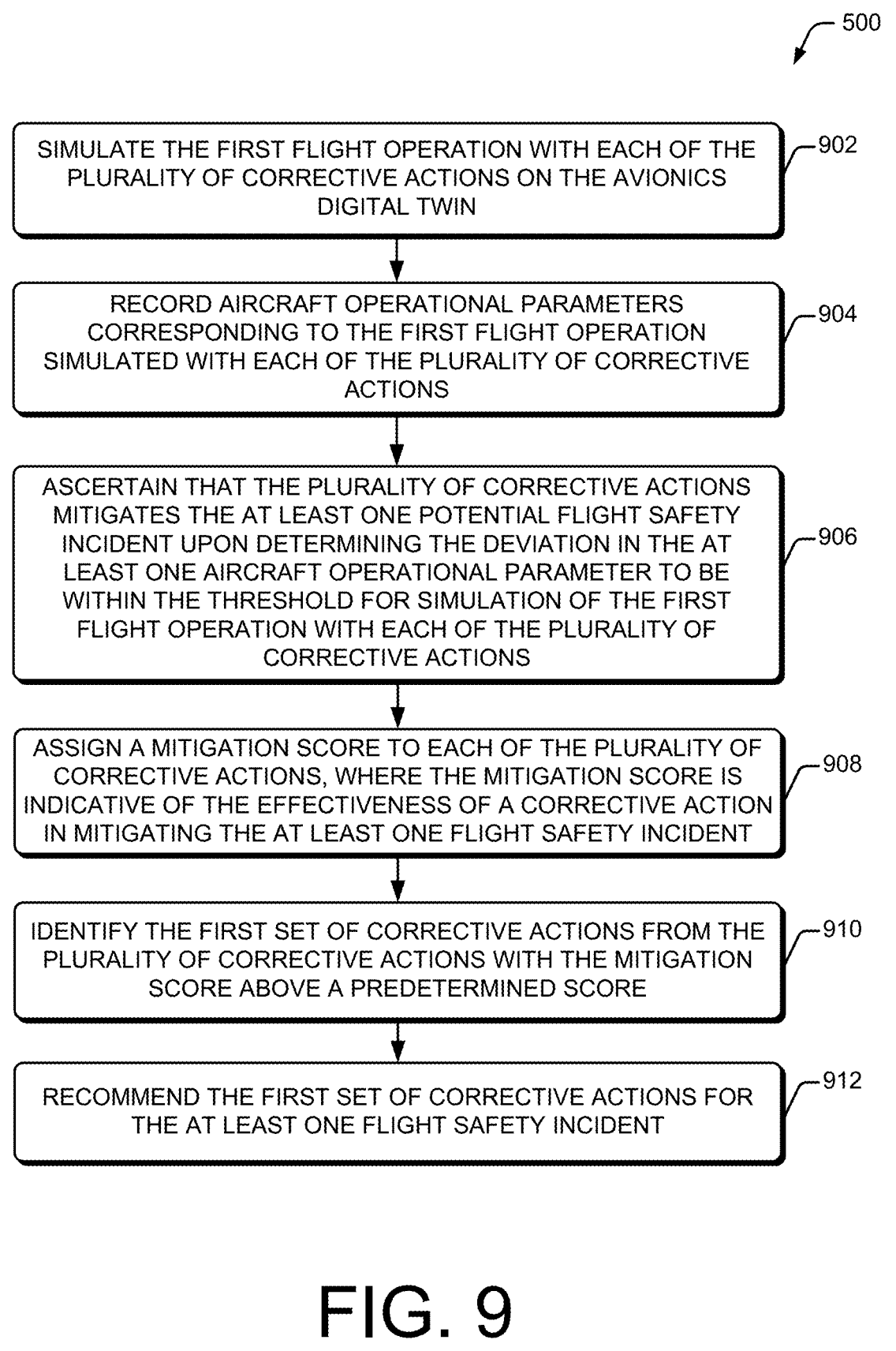

SIMULATE THE FIRST FLIGHT OPERATION WITH EACH OF THE PLURALITY OF CORRECTIVE ACTIONS ON THE AVIONICS DIGITAL TWIN ⌐902

RECORD AIRCRAFT OPERATIONAL PARAMETERS CORRESPONDING TO THE FIRST FLIGHT OPERATION SIMULATED WITH EACH OF THE PLURALITY OF CORRECTIVE ACTIONS ⌐904

ASCERTAIN THAT THE PLURALITY OF CORRECTIVE ACTIONS MITIGATES THE AT LEAST ONE POTENTIAL FLIGHT SAFETY INCIDENT UPON DETERMINING THE DEVIATION IN THE AT LEAST ONE AIRCRAFT OPERATIONAL PARAMETER TO BE WITHIN THE THRESHOLD FOR SIMULATION OF THE FIRST FLIGHT OPERATION WITH EACH OF THE PLURALITY OF CORRECTIVE ACTIONS ⌐906

ASSIGN A MITIGATION SCORE TO EACH OF THE PLURALITY OF CORRECTIVE ACTIONS, WHERE THE MITIGATION SCORE IS INDICATIVE OF THE EFFECTIVENESS OF A CORRECTIVE ACTION IN MITIGATING THE AT LEAST ONE FLIGHT SAFETY INCIDENT ⌐908

IDENTIFY THE FIRST SET OF CORRECTIVE ACTIONS FROM THE PLURALITY OF CORRECTIVE ACTIONS WITH THE MITIGATION SCORE ABOVE A PREDETERMINED SCORE ⌐910

RECOMMEND THE FIRST SET OF CORRECTIVE ACTIONS FOR THE AT LEAST ONE FLIGHT SAFETY INCIDENT ⌐912

FIG. 9

FLIGHT SAFETY OPERATIONS OPTIMIZATION

BACKGROUND

Aviation is considered as the safest and fastest mode of transport. Various flight safety operations are undertaken by airlines to ensure the safety of aircraft being operated by such airlines. As a part of flight safety operations, airlines typically follow a flight data monitoring process. The flight data monitoring process is facilitated by a flight data recorder device that interacts with various avionics installed on the aircraft and collects aircraft operational parameters during a flight operation. The collected aircraft operational parameters are then analyzed to identify potential flight safety incidents associated with the flight operation and safety protocols for mitigating such flight safety incidents are developed.

BRIEF DESCRIPTION OF DRAWINGS

FIG. 3 illustrates a schematic of the flight safety optimization system, in accordance with an example of the present subject matter, FIGS. 5 and 6 illustrate methods for optimizing flight safety operations for aircrafts, in accordance with examples of the present subject matter, FIGS. 8 and 9 illustrates methods for optimizing flight safety operations for aircrafts, in accordance with yet other examples of the present subject matter.

Figure 1:
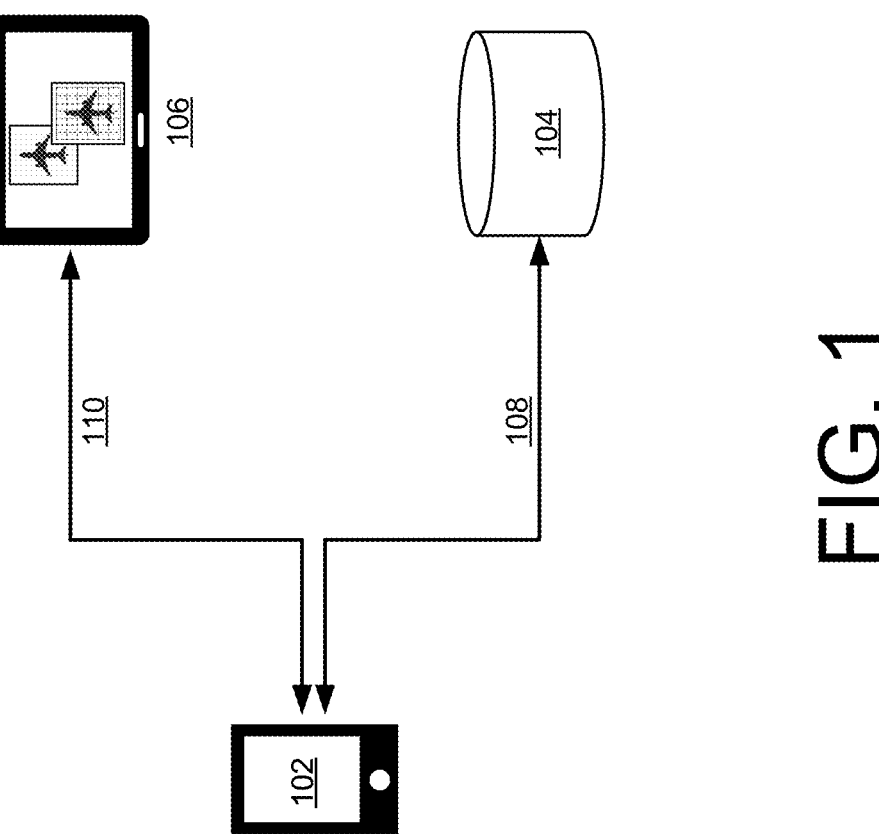
FIG. 1 illustrates an environment for implementing a flight safety optimization system, in accordance with an example of the present subject matter.

Throughout the drawings, identical reference numbers designate similar, but not necessarily identical, elements. The drawings provide examples and/or implementations consistent with the description; however, the description is not limited to the examples and/or implementations provided in the drawings.

DETAILED DESCRIPTION

Known methods of developing flight safety operations include collecting aircraft operational parameters during the flight operation by using Flight Data Recorder (FDR) device that interacts with various avionics installed on an aircraft, transferring the collected aircraft operational parameters to a database upon completion of a flight operation of the aircraft, and analyzing the collected aircraft operational parameters for identification of potential flight safety incidents associated with the flight operation. In the aforementioned process, the analysis of the collected aircraft operational parameters for identification of the potential flight safety incidents is conducted by human analysts who compare the collected aircraft operational parameters against various predefined thresholds and detect the potential flight safety incidents when deviations in the aircraft operational parameters are beyond the thresholds. Upon the detection of the potential flight safety incidents, the aircraft operational parameters linked to the potential flight safety incidents are forwarded to a flight safety crew who identifies various corrective actions that could be undertaken if such flight safety incidents occur during upcoming flight operations.

As may be gathered, while known methods of the flight safety operations provide means for mitigating the potential flight safety incidents, such methods are subjective to expertise of the human analysts responsible for conducting analysis of collected aircraft operational parameters and the flight safety crew responsible for identification of the various corrective actions to be undertaken for mitigating such flight safety incidents. Accordingly, such methods of flight safety operations are prone to errors and are inefficient.

According to examples of the present subject matter, techniques for optimizing flight safety operations for aircrafts are described.

In an example implementation, aircraft operational parameters corresponding to a plurality of flight operations may be retrieved. The aircraft operational parameters may then be analyzed using a first machine learning model to identify a first flight operation from amongst the plurality of flight operations, where the first flight operation may include at least one aircraft operational parameter with deviation beyond a threshold. In an example, the first machine learning model may be an unsupervised machine learning model Thereafter, at least one potential flight safety incident corresponding to the first flight operation may be identified. In an example, the at least one flight safety incident may be identified based on the at least one aircraft operational parameter.

The at least one potential flight safety incident may then be analyzed using a second machine learning model for identifying a corrective action corresponding to the potential flight safety incidents. The second machine learning model may be trained using a plurality of flight safety artifacts, where the plurality of flight safety artifacts is indicative of potential flight safety incidents and corrective actions to be initiated in response to the potential flight safety incidents. In an example, the second machine learning model may be a reinforcement-based machine learning model.

Thereafter, the corrective action may be subjected to an avionics digital twin to determine that the corrective action mitigates the at least one potential flight safety incident. In response to the determination, the corrective action may be recommended for the at least one potential flight safety incident.

By using machine learning models for identifying potential flight safety incidents and corrective actions for such flight safety incidents, reliance on human analyst's' expertise is reduced, thereby minimizing the risk of errors. Further, the use of the first machine learning model allows for detection of anomalies or patterns that human analysts might miss, potentially identifying more or novel types of flight safety incidents. Furthermore, subjection of the corrective actions to the avionics digital twin before recommending such corrective actions for mitigating potential flight safety incidents provides an additional layer of verification before implementation, thereby reducing the risk of ineffective or harmful safety measures. As a result, flight safety operations for aircrafts are optimized.

The above techniques are further described with reference to FIGS. 1 to 10. It would be noted that the description and the figures merely illustrate the principles of the present subject matter along with examples described herein and would not be construed as a limitation to the present subject matter. It is thus understood that various arrangements may be devised that, although not explicitly described or shown herein, embody the principles of the present subject matter. Moreover, all statements herein reciting principles, aspects, and implementations of the present subject matter, as well as specific examples thereof, are intended to encompass equivalents thereof.

FIG. 1 illustrates an environment 100 for implementing a Flight Safety Optimization (FSO) system 102, in accordance with an example of the present subject matter. Examples of the environment 100 may include, but are not limited to, aircraft, Air Traffic Control (ATC) tower, and Air Route Traffic Control Center (ARTCC).

The FSO system 102 may be implemented to optimize the flight safety operations for the aircrafts. Examples of the FSO system 102 may vary depending on the environment 100 where the FSO system 102 is being implemented. For instance, when the environment 100 is aircraft, examples of the FSO system 102 may include, but are not limited to, Electronic Flight Bag (EFB) and on-board Flight Management System (FMS). On the other hand, when the environment 100 is ATC tower or ARTCC, examples of the FSO system 102 may include, but are not limited to, laptops, desktops, smartphones, and tablets.

The environment 100 may further include a Quick Access Recorder (QAR) database 104 communicatively coupled to the FSO system 102. The QAR database 104 may be communicatively coupled to the FSO system 102 via a first communication network 108. The first communication network 108 can be a wireless or a wired network, or a combination thereof. Further, the first communication network 108 can be a collection of individual networks, interconnected with each other and functioning as a single large network. Examples of the first communication network 108 may vary depending on the environment 100 where the FSO system 102 is being implemented. For instance, when the environment 100 is the aircraft, the first communication network 108 may include satellite communication (SAT-COM). On the other hand, when the environment 100 is the ATC tower or ARTCC, the first communication network 108 may be Global System for Mobile communication (GSM) network, Universal Mobile Telecommunications System (UMTS) network, Long Term Evolution (LTE) network, personal communications service (PCS) network, Time-division multiple access (TDMA) network, Code-Division Multiple Access (CDMA) network, next-generation network (NGN), public switched telephone network (PSTN), Integrated Services Digital Network (ISDN), or a combination thereof.

Figure 2:
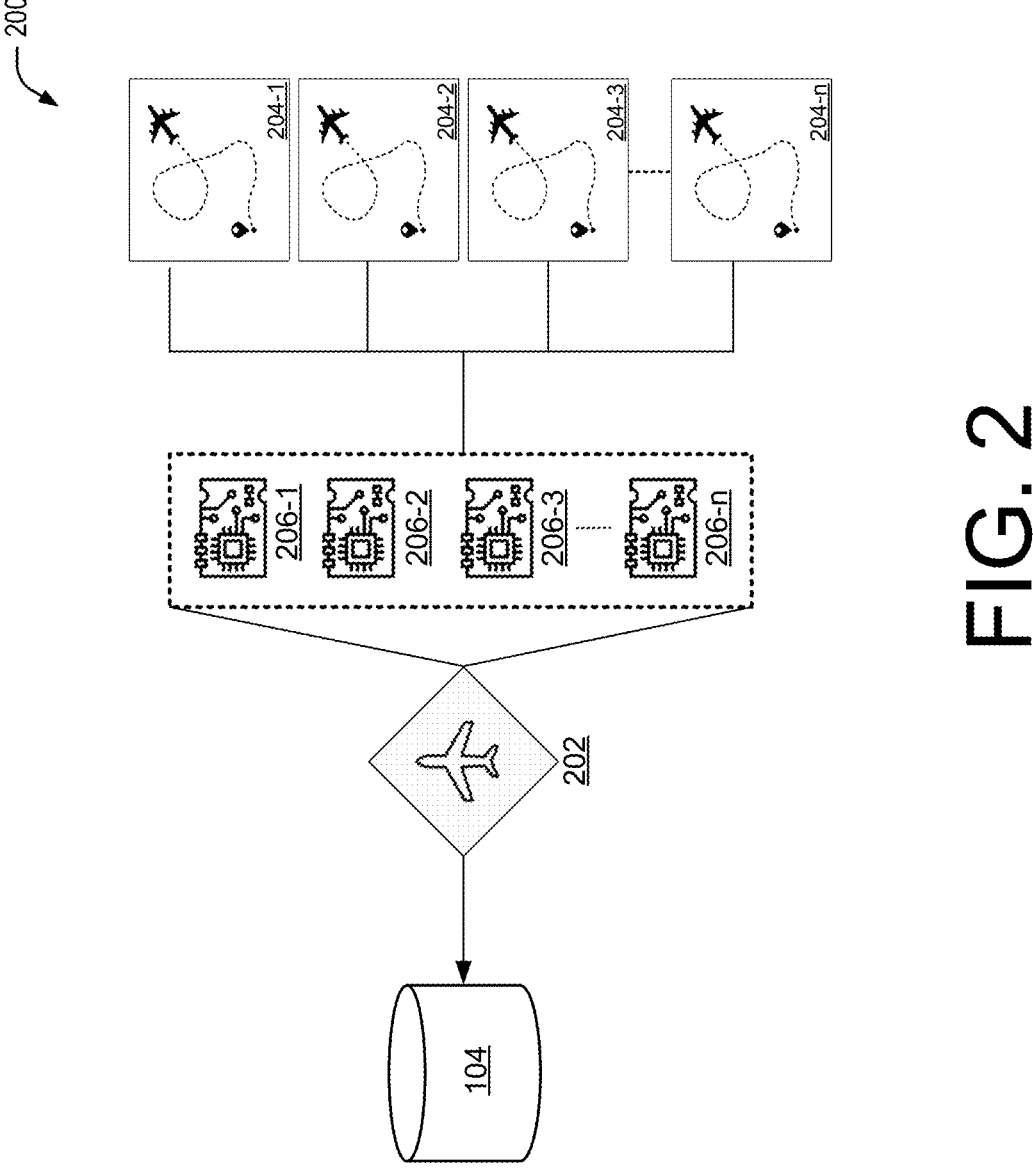
FIG. 2 illustrates the environment for implementing the flight safety optimization system, in accordance with another example of the present subject matter.

The QAR database 104 may store flight data corresponding to a plurality of flight operations completed by an aircraft. As illustrated in FIG. 2, the QAR database 104 may receive the flight data from the aircraft 202, where the aircraft 202 may complete a plurality of flight operations 204-1, 204-2, 204-3, . . . , 204-n. The flight data corresponding to a flight operation, such as the flight operation 204-1, may constitute various aircraft operational parameters recorded during the flight operation 204-1.

In an example, flight data corresponding to the flight operation, 204-1 may be recorded by various avionics components 206-1, 206-2, 206-3, . . . , 206-n available onboard the aircraft 202. The avionics components 206-1, 206-2, 206-3, . . . , 206-n may then send the flight data to a flight data recorder device (not shown) available onboard the aircraft 202. Examples of the flight data recorder device may include, but are not limited to, Quick Access Recorder (QAR) and Flight Data Recorder (FDR). When the flight operation 204-1 is completed, the flight data recorder device may send the flight data corresponding to the flight operation 204-1 to an EFB (not shown) available onboard the aircraft. The EFB may subsequently send the flight data corresponding to the flight operation 204-1 to the QAR database 104.

The environment 100 may further include an avionics digital twin communicatively coupled to the FSO system 102. The avionics digital twin may be a virtual representation of avionics components available onboard an aircraft and may be utilized for simulating flight operations corresponding to the aircraft. The avionics digital twin may be communicatively coupled to the FSO system 102 either through a direct communication link, or through multiple communication links of a second communication network 110. The second communication network 110 can be a wireless or a wired network, or a combination thereof. Examples of the second communication network 110 may include, but are not limited to, Global System for Mobile communication (GSM) network, Universal Mobile Telecommunications System (UMTS) network, Long Term Evolution (LTE) network, personal communications service (PCS) network, Time-division multiple access (TDMA) network, Code-Division Multiple Access (CDMA) network, next-generation network (NGN), public switched telephone network (PSTN), Integrated Services Digital Network (ISDN), or a combination thereof.

It would be noted that while the avionics digital twin 106 has been described to be implemented on a computing device separate from the FSO system, the avionics digital twin can also be implemented on the FSO system 102. For instance, when the FSO system 102 is the EFB, the avionics digital twin may be installed on the EFB as an application program.

In operation, the FSO system 102 may retrieve aircraft operational parameters corresponding to a plurality of flight operations. The FSO system 102 may retrieve the aircraft operational parameters corresponding to the plurality of flight operations from the QAR database 104.

The FSO system 102 may then analyze the aircraft operational parameters using a first machine learning model to identify a first flight operation from amongst the plurality of flight operations, where the first flight operation comprises at least one aircraft operational parameter with deviation beyond a threshold. The FSO system 102 may then identify at least one potential flight safety incident corresponding to the first flight operation. In an example, the FSO system 102 may identify the flight safety incident using the at least one aircraft operational parameter.

Upon identification of the flight safety incident, the FSO system 102 may analyze the at least one potential flight safety incident to identify a corrective action for the potential flight safety incident. In an example, the FSO system 102 may utilize a second machine learning model trained using flight safety artifacts to identify the corrective action, where the flight safety artifacts include flight safety incidents and corrective actions to be initiated in response to the plurality of flight safety incidents.

Upon identification of the corrective action, the FSO system 102 may subject the corrective action to an avionics digital twin 106. The FSO system 102 may subject the corrective action to an avionics digital twin 106 to ascertain that the corrective action mitigates the at least one potential flight safety incident.

If the FSO system 102 determines that the corrective action mitigates the at least one potential flight safety incident, the FSO system 102 may recommend the corrective action for the at least one potential flight safety incident. Further details related to optimization of the flight safety operations for the aircrafts are explained in conjunction with the forthcoming figures.

Figure 3:
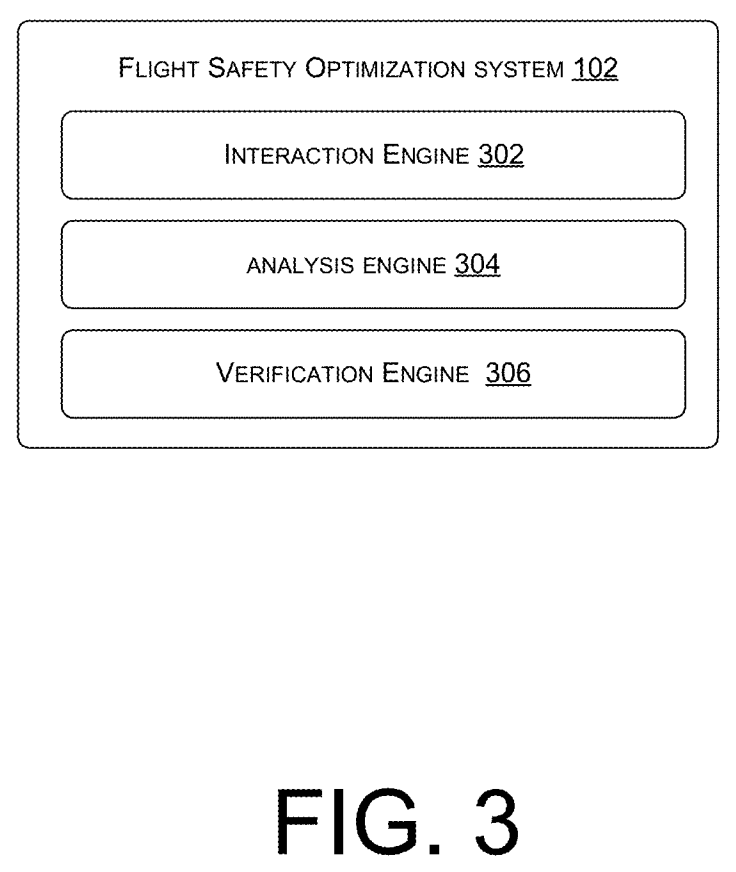

FIG. 3 illustrates a schematic of the FSO system 102, in accordance with an example of the present subject matter.

The FSO system 102 may include an interaction engine 302. The interaction engine 302 may retrieve aircraft operational parameters corresponding to a plurality of flight operations. In an example, the interaction engine 302 may retrieve the aircraft operational parameters corresponding to the plurality of flight operations from the QAR database 104. In the example, the plurality of flight operations may correspond to an aircraft, such as the aircraft 202. The aircraft operational parameters for the plurality of flight operations corresponding to the aircraft 202 may be retrieved and analyzed to determine the potential flight safety incidents for the aircraft 202 and corrective actions to be initiated for mitigating such flight safety incidents for the aircraft 202.

The FSO system 102 may further include an analysis engine 304 coupled to the interaction engine 302. The analysis engine 304 may analyze the aircraft operational parameters to identify a first flight operation from amongst the plurality of flight operations, where the first flight operation comprises at least one aircraft operational parameter with deviation beyond a threshold. In an example, the analysis engine 304 may analyze the aircraft operational parameters using a first machine learning model. In the example, the first machine learning model may be an unsupervised machine learning model.

The analysis engine 304 may then identify at least one potential flight safety incident corresponding to the first flight operation. In an example, the analysis engine 304 may identify the flight safety incident using the at least one aircraft operational parameter with the deviation beyond the threshold.

Upon identification of the flight safety incident, the analysis engine 304 may analyze the at least one potential flight safety incident to identify a corrective action for the potential flight safety incident. In an example, the analysis engine 304 may utilize a second machine learning model trained using flight safety artifacts to identify the corrective action, where the flight safety artifacts include flight safety incidents and corrective actions to be initiated in response to the plurality of flight safety incidents.

Further, the FSO system 102 may include a verification engine 306 coupled to the analysis engine 304. Upon identification of the corrective action, the verification engine 306 may subject the corrective action to an avionics digital twin to ascertain that the corrective action mitigates the at least one potential flight safety incident. In an example, the avionics digital twin 106 may emulate avionics components available onboard the aircraft 202. If the verification engine 306 determines that the corrective action mitigates the at least one potential flight safety incident, the verification engine 306 may recommend the corrective action for the at least one potential flight safety incident.

Figure 4:
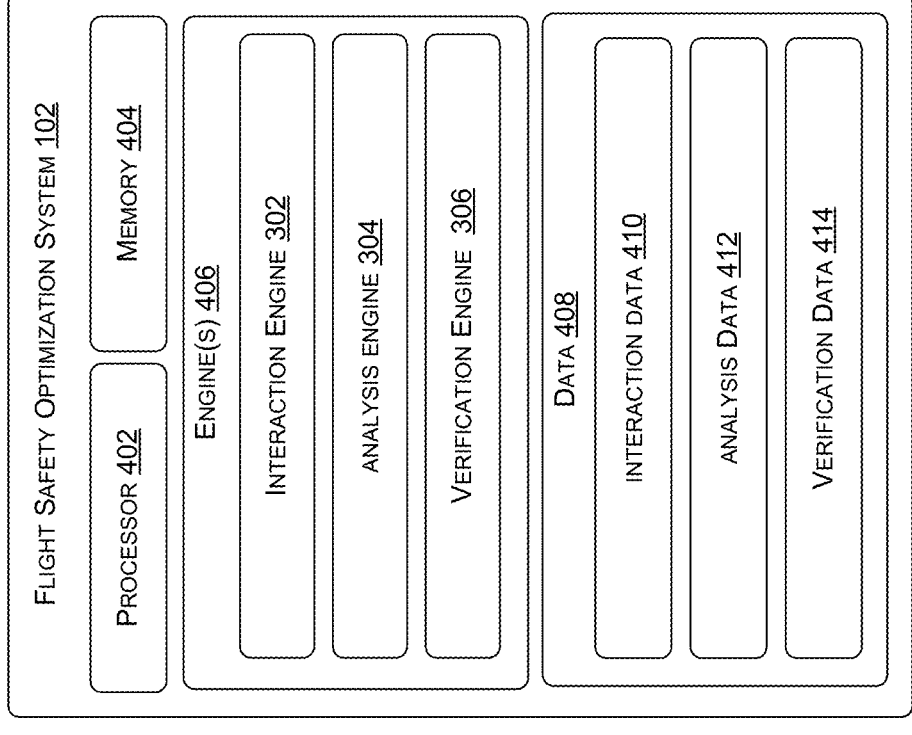
FIG. 4 illustrates the schematic of the flight safety optimization system, in accordance with another example of the present subject matter.

FIG. 4 illustrates the schematic of the FSO system 102, in accordance with another example of the present subject matter. As explained earlier, the FSO system 102 may be configured to optimize the flight safety operations for the aircrafts.

In an example, the FSO system 102 includes a processor 402 and a memory 404 coupled to the processor 402. The functions of the various elements shown in the FIGs., including any functional blocks labelled as "processor(s)", may be provided through the use of dedicated hardware as well as hardware capable of executing instructions. When provided by a processor, the functions may be provided by a single dedicated processor, by a single shared processor, or by a plurality of individual processors, some of which may be shared. Moreover, explicit use of the term "processor" would not be construed to refer exclusively to hardware capable of executing instructions, and may implicitly include, without limitation, digital signal processor (DSP) hardware, network processor, application specific integrated circuit (ASIC), field programmable gate array (FPGA), read only memory (ROM) for storing instructions, random access memory (RAM), non-volatile storage. Other hardware, conventional and/or custom, may also be included.

The memory 404 may include any computer-readable medium including, for example, volatile memory (e.g., RAM), and/or non-volatile memory (e.g., EPROM, flash memory, etc.).

The FSO system 102 may further include engine(s) 406, where the engine(s) 406 may include the interaction engine 302, the analysis engine 304, and the verification engine 306. In an example, the engine(s) 406 may be implemented as a combination of hardware and firmware or software. In examples described herein, such combinations of hardware and firmware may be implemented in several different ways. For example, the firmware for the engine may be processor executable instructions stored on a non-transitory machine-readable storage medium and the hardware for the engine may include a processing resource (for example, implemented as either a single processor or a combination of multiple processors), to execute such instructions.

In the present examples, the machine-readable storage medium may store instructions that, when executed by the processing resource, implement the functionalities of the engines. In such examples, the FSO system 102 may include the machine-readable storage medium storing the instructions and the processing resource to execute the instructions. In other examples of the present subject matter, the machine-readable storage medium may be located at a different location but accessible to the FSO system 102 and the processor 402.

The FSO system 102 may further include data 408, that serves, amongst other things, as a repository for storing data that may be fetched, processed, received, or generated by the engine(s) 406. In an example, the data 408 may include interaction data 410, analysis data 412, and verification data 414. In an example, the data 408 may be stored in the memory 404.

In an example implementation, the interaction engine 302 may retrieve aircraft operational parameters corresponding to a plurality of flight operations. In an example, the plurality of flight operations may correspond to the aircraft 202. The interaction engine 302 may retrieve the aircraft operational parameters corresponding to a plurality of flight operations from the QAR database 104. The interaction engine 302 may then store the aircraft operational parameters in the interaction data 410.

The analysis engine 304 may then analyze the aircraft operational parameters using a first machine learning model to identify at least one aircraft operational parameter with threshold beyond a threshold. In an example, the first machine learning model may be an unsupervised machine learning model. In the example, the unsupervised machine learning model may be an anomaly detection machine learning model. Examples of the first machine learning model may include, but are not limited to, Isolation Forest, Local Outlier Factor, Robust Covariance, One-class Support Vector Machine (SVM), and One-class SVM with Stochastic Gradient Descent (SGD). Upon identification of the aircraft operational parameter with deviation beyond the threshold, the analysis engine 304 may identify a first flight operation corresponding to the at least one aircraft operational parameter. The analysis engine 304 may then store the first flight operation in the analysis data 412.

Subsequently, the analysis engine 304 may identify at least one potential flight safety incident corresponding to the first flight operation. In an example, the analysis engine 304 may identify the potential flight safety incident using the at least one aircraft operational parameter with deviation beyond the threshold. The analysis engine 304 may then store the at least one potential flight safety incident in the analysis data 412.

In an example implementation, upon identification of the flight safety incident, the analysis engine 304 may analyze the at least one potential flight safety incident to identify a corrective action for the potential flight safety incident. In an example, the analysis engine 304 may utilize a second machine learning model trained using flight safety artifacts to identify the corrective action, where the flight safety artifacts include flight safety incidents and corrective actions to be initiated in response to the plurality of flight safety incidents. Examples of the flight safety artifacts include, but are not limited to, flight safety regulatory documents, aviation safety reports, flight data recording manuals, quick access recorders data frame layout, crew roaster, airline safety policies, flight data monitoring reports, and accident investigation reports. The analysis engine 304 may then store the corrective action in the analysis data 412.

Upon identification of the corrective action, the verification engine 306 may subject the corrective action to the avionics digital twin 106. As already described, the avionics digital twin 106 may emulate the avionics components of the aircraft 202. In the example, to subject the corrective action to the avionics digital twin 106, the verification engine 306 may simulate the first flight operation with the corrective action on the avionics digital twin 106. Thereafter, the verification engine 306 may record aircraft operational parameters corresponding to the first flight operation. The verification engine 306 may then store the aircraft operational parameters corresponding to the first flight operation in the verification data 414.

The verification engine 306 may then determine if the deviation in the at least one aircraft operational parameter is within the threshold. If the deviation in the at least one aircraft operational parameter is determined to be within the threshold, the verification engine 306 ascertains that the corrective action mitigates the at least one potential flight safety incident.

In an example, the second machine learning model may be a reinforcement-based machine learning model. In the example, upon determining that the corrective action mitigates the at least one potential flight safety incident, the analysis engine 304 may reward the second machine learning model.

The verification engine 306 may further compute flight operation characteristics associated with simulation of the first flight operation with the corrective action. The flight operation characteristics may include the flight time, fuel consumption, and ATC approval confidence score corresponding to the first flight operation. The verification engine 306 may then render the corrective action along with the flight operation characteristics.

In an illustrative example, the interaction engine 302 may retrieve aircraft operational parameters from various flight operations of first aircraft. The aircraft operational parameters may include altitude, airspeed, fuel consumption, and engine temperature collected during the flight operations. The analysis engine 304 may analyze the aircraft operational parameters using the first machine learning model and identify a flight operation where the engine temperature exceeded normal thresholds during takeoff. Based on the engine temperature, the analysis engine 304 may identify a potential flight safety incident of engine overheating during takeoff. The analysis engine 304 may then analyze the potential flight safety incident of engine overheating during takeoff using the second machine learning model and identify a corrective action involving adjusting the engine thrust settings during takeoff to prevent engine overheating. The verification engine 306 may then simulate the flight operation with the corrective action using an avionics digital twin emulating the avionics components of the first aircraft and records the new set of aircraft operational parameters, particularly focusing on the engine temperature. The verification engine 306 may ascertain that the simulated engine temperature stays within the acceptable threshold during takeoff, confirming that the corrective action mitigates the potential flight safety incident. Accordingly, the verification engine 306 may recommend the corrective action involving adjustment of the engine thrust settings during takeoff to prevent future instances of engine overheating during takeoff for the first aircraft.

In another illustrative example, the interaction engine 302 may retrieve aircraft operational parameters from multiple flight operations of a second aircraft. The aircraft operational parameters may include data on fuel consumption, flight paths, weather conditions encountered, and reports of turbulence. The analysis engine 304 may analyze the aircraft operational parameters using the first machine learning model and identify a first flight operation where the aircraft encountered severe turbulence while flying a particular route over the North Atlantic during winter months. Based on the turbulence, the analysis engine 304 may identify a potential flight safety incident of increased risk of clear air turbulence, which could lead to passenger injuries and aircraft stress. The analysis engine 304 may then analyse the potential flight safety incident of increased risk of clear air turbulence using the second machine learning model and identify a corrective action involving modification of the flight route to a slightly longer but smoother path that avoids areas with high probability of clear air turbulence. The verification engine 306 may then simulate the first flight operation with the corrective action on an avionics digital twin that emulates the avionics components of the second aircraft. During the simulation, the verification engine 306 may record the aircraft operational parameters, particularly focusing on the predicted turbulence levels, fuel consumption, and flight duration. Based on the simulation, the verification engine 306 may ascertain that in the simulation, the aircraft encounters significantly less turbulence while only marginally increasing flight time and fuel consumption, confirming that the corrective action mitigates the potential flight safety incident. Accordingly, the verification engine 306 may recommend the corrective action involving modification of the flight route during winter months to avoid areas of likely clear air turbulence to improve passenger safety and reduce aircraft stress for the route across the North Atlantic.

In another example implementation, the analysis engine 304 may analyze the at least one potential flight safety incident to identify a plurality of corrective actions for the potential flight safety incident. In the example, the analysis engine 304 may utilize the second machine learning model trained using flight safety artifacts to identify the plurality of corrective actions. The analysis engine 304 may then store the plurality of corrective actions in the analysis data 412.

Upon identification of the plurality of corrective actions, the verification engine 306 may subject the plurality of corrective actions to the avionics digital twin 106. In an example, to subject the corrective action to the avionics digital twin 106, the verification engine 306 may simulate the first flight operation with each of the plurality of corrective actions on the avionics digital twin 106. Thereafter, the verification engine 306 may record aircraft operational parameters corresponding to simulation of the first flight operation with each of the plurality of corrective actions. If the at least one aircraft operational parameter is determined to be within the threshold for the simulations of the first flight operation with each of the plurality of corrective actions.

The verification engine 306 may then assign a mitigation score to each of the plurality of corrective actions, where the mitigation score may be indicative of the effectiveness of a corrective action in mitigating the at least one flight safety incident. In the example, the verification engine 306 may then identify a first set of corrective actions, from amongst the plurality of corrective actions, with mitigation score to be greater than a predetermined value. The verification engine 306 may then store the first set of corrective actions in the verification data 414. Subsequently, the verification engine 306 may recommend the first set of flight operations for the at least one potential flight safety incident.

In an example, the verification engine 306 may further compute flight operation characteristics associated with simulation of the first flight operation with each of the plurality of corrective actions. The flight operation characteristics may include the flight time, fuel consumption, and ATC approval confidence score corresponding to each of the first set of flight operations. The verification engine 306 may then render each of the corrective actions along with the corresponding flight operation characteristics.

By using machine learning models for identifying potential flight safety incidents and corrective actions for such flight safety incidents, reliance on human analyst's' expertise is reduced, thereby minimizing the risk of errors. Further, the use of the first machine learning model allows for detection of anomalies or patterns that human analysts might miss, potentially identifying more or novel types of flight safety incidents. Furthermore, subjection of the corrective actions to the avionics digital twin before recommending such corrective actions for mitigating potential flight safety incidents provides an additional layer of verification before implementation, thereby reducing the risk of ineffective or harmful safety measures. As a result, flight safety operations for aircrafts are optimized.

FIGS. 5 and 6 illustrate methods 500 and 600 for optimizing flight safety operations for aircrafts, in accordance with examples of the present subject matter. The order in which the methods are described is not intended to be construed as a limitation, and any number of the described method blocks may be combined in any order to implement the methods, or an alternative method. Further, the methods 500 and 600 may be implemented by processing resource or computing device(s) through any suitable hardware, non-transitory machine-readable instructions, or combination thereof.

It may also be understood that methods 500 and 600 may be performed by programmed computing devices, such as the FSO system 102, as depicted in FIG. 4. Furthermore, the methods 500 and 600 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. The methods 500 and 600 are described below with reference to the FSO system 102, as described above; other suitable systems for the execution of these methods may also be utilized. Additionally, implementation of the method is not limited to such examples.

At block 502, aircraft operational parameters corresponding to a plurality of flight operations may be retrieved. The plurality of flight operations may correspond to an aircraft. The aircraft operational parameters may be retrieved from a Quick Access Recorder (QAR) database storing flight data for the plurality of flight operations. In an example, the aircraft operational parameters may be retrieved by the interaction engine 302.

At step 504, the aircraft operational parameters may be analyzed to identify a first flight operation from amongst the plurality of flight operations, where the first flight operation comprises at least one aircraft operational parameter with deviation beyond a threshold. The aircraft operational parameters may be analyzed using a first machine learning model, where the first machine learning model may be unsupervised machine learning model. In an example, the aircraft operational parameters may be analyzed by the analysis engine 304.

At step 506, at least one potential flight safety incident corresponding to the first flight operation may be identified. The at least one flight safety incident may be identified using the at least one aircraft operational parameter. In an example, the at least one potential flight safety incident may be identified by the analysis engine 304.

At step 508, the at least one potential flight safety incident may be analyzed to identify a corrective action for the potential flight safety incident. The at least one potential flight safety incident may be analyzed using a second machine learning model, where the second machine learning model is trained using flight safety artifacts comprising a plurality of flight safety incidents and corrective actions to be initiated in response to the plurality of flight safety incidents. Examples of the flight safety artifacts include, but are not limited to, flight safety regulatory documents, aviation safety reports, flight data recording manuals, quick access recorders data frame layout, crew roaster, airline safety policies, flight data monitoring reports, and accident investigation reports. In an example, the at least one potential flight safety incident may be analyzed by the analysis engine 304.

At step 510, the corrective action may be subjected to an avionics digital twin to ascertain that the corrective action mitigates the at least one potential flight safety incident.

In an example, the second machine learning model may be a reinforcement-based machine learning model. In the example, upon determining that the corrective action mitigates the at least one potential flight safety incident, the second machine learning model may be reward for identification of a corrective action that mitigates the at least one potential flight safety incident.

At step 512, the corrective action for the at least one potential flight safety incident may be recommended. In an example, the corrective action may be recommended by the verification engine 306.

FIG. 6 illustrates a method for subjecting the corrective action to the avionics digital twin, in accordance with an example of the present subject matter.

At block 602, the first flight operation may be simulated with the corrective action on the avionics digital twin. In an example, the first flight operation may be simulated by the verification engine 306.

At block 604, aircraft operational parameters corresponding to the first flight operation may be recorded. In an example, the aircraft operational parameters may be recorded by the verification engine 306.

At block 606, deviation in the at least one aircraft operational parameter may be determined to be within the threshold. In an example, deviation in the at least one aircraft operational parameter may be determined to be within the threshold by the verification engine 306.

At block 608, it may be ascertained that the corrective action mitigates the at least one flight safety incident. In an example, it may be ascertained that the corrective action mitigates the at least one flight safety incident when the deviation in the at least one aircraft operational parameter is found to be within the threshold. The corrective action mitigates the at least one flight safety incident may be ascertained by the verification engine 306.

Figure 7A:
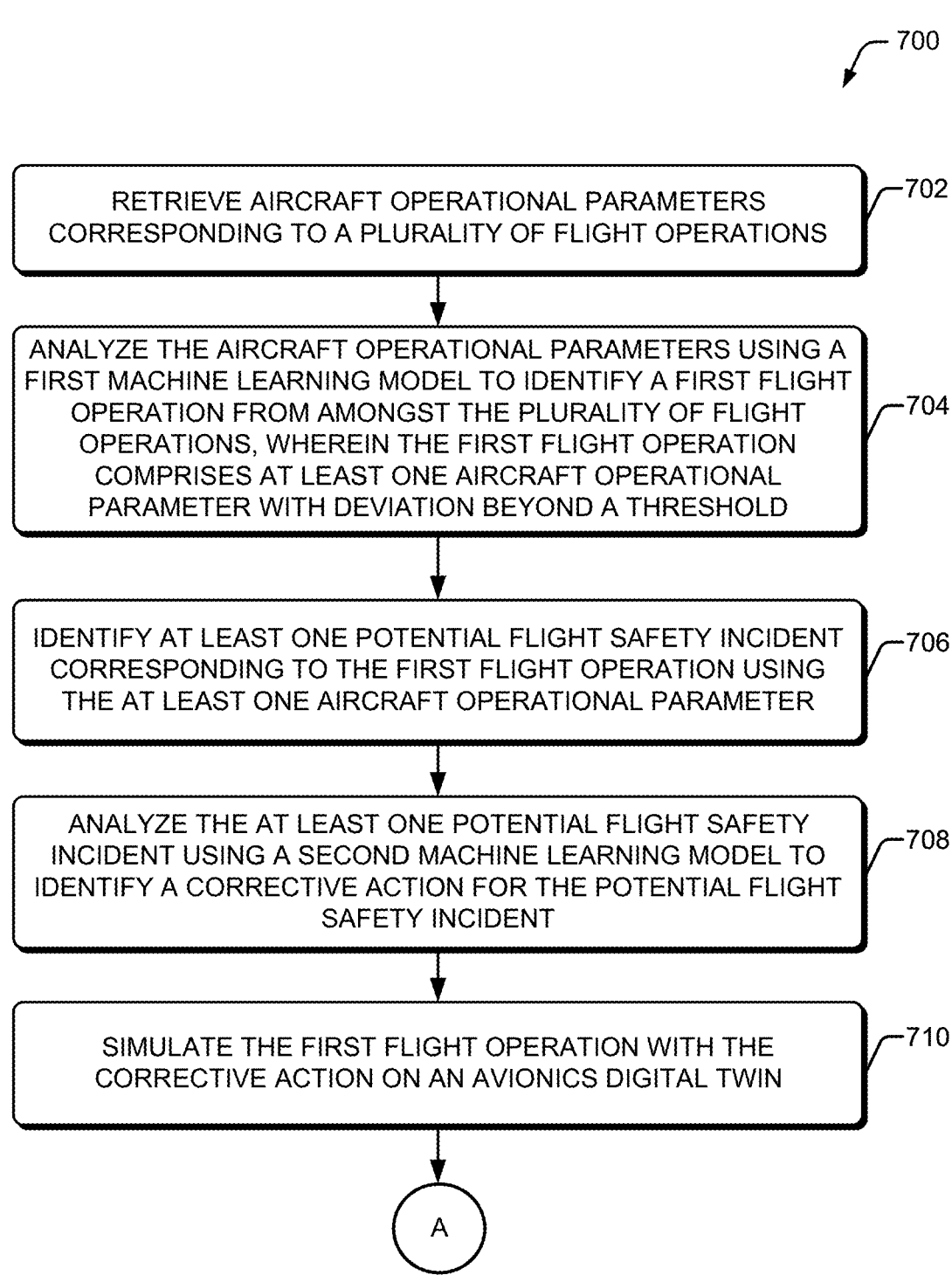
FIGS. 7A and 7B illustrates a method for optimizing flight safety operations for aircrafts, in accordance with another example of the present subject matter.
Figure 7B:
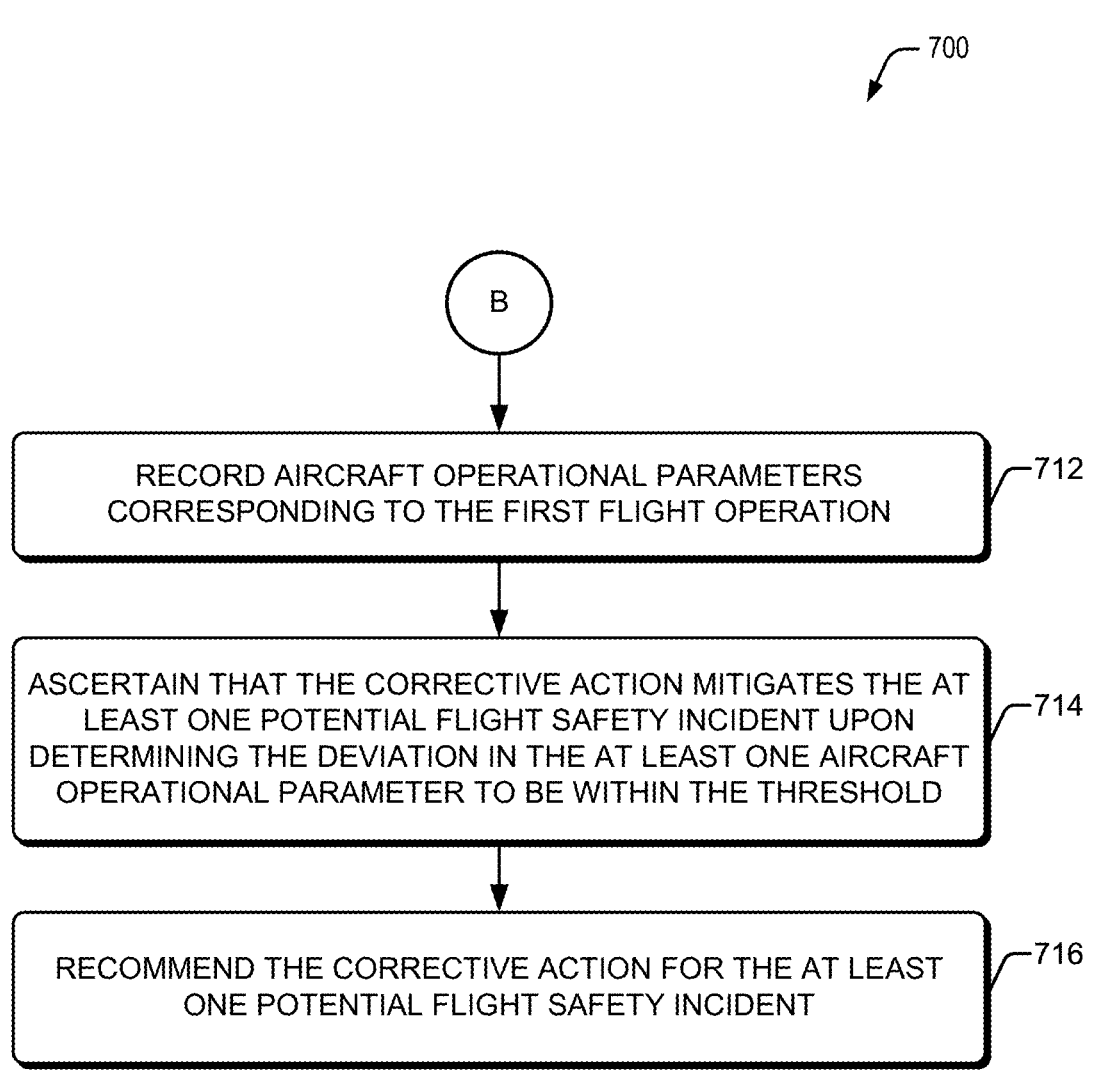

FIGS. 7A and 7B illustrate a method for optimizing flight safety operations for aircrafts, in accordance with examples of the present subject matter. The order in which the methods are described is not intended to be construed as a limitation, and any number of the described method blocks may be combined in any order to implement the methods, or an alternative method. Further, the method 700 may be implemented by processing resource or computing device(s) through any suitable hardware, non-transitory machine-readable instructions, or combination thereof.

It may also be understood that method 700 may be performed by programmed computing devices, such as the FSO system 102, as depicted in FIG. 4. Furthermore, the method 700 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. The method 700 is described below with reference to the FSO system 102, as described above; other suitable systems for the execution of these methods may also be utilized. Additionally, implementation of the method is not limited to such examples.

At block 702, aircraft operational parameters corresponding to a plurality of flight operations may be retrieved. The plurality of flight operations may correspond to an aircraft. The aircraft operational parameters may be retrieved from a Quick Access Recorder (QAR) database storing flight data for the plurality of flight operations. In an example, the aircraft operational parameters may be retrieved by the interaction engine 302.

At step 704, the aircraft operational parameters may be analyzed to identify a first flight operation from amongst the plurality of flight operations, where the first flight operation comprises at least one aircraft operational parameter with deviation beyond a threshold. The aircraft operational parameters may be analyzed using a first machine learning model, where the first machine learning model may be unsupervised machine learning model. In an example, the aircraft operational parameters may be analyzed by the analysis engine 304.

At step 706, at least one potential flight safety incident corresponding to the first flight operation may be identified. The at least one flight safety incident may be identified using the at least one aircraft operational parameter. In an example, the at least one potential flight safety incident may be identified by the analysis engine 304.

At step 708, the at least one potential flight safety incident may be analyzed to identify a corrective action for the potential flight safety incident. The at least one potential flight safety incident may be analyzed using a second machine learning model, where the second machine learning model is trained using flight safety artifacts comprising a plurality of flight safety incidents and corrective actions to be initiated in response to the plurality of flight safety incidents. Examples of the flight safety artifacts include, but are not limited to, flight safety regulatory documents, aviation safety reports, flight data recording manuals, quick access recorders data frame layout, crew roaster, airline safety policies, flight data monitoring reports, and accident investigation reports. In an example, the at least one potential flight safety incident may be analyzed by the analysis engine 304.

At step 710, the first flight operation may be simulated with the corrective action on an avionics digital twin. In an example, the first flight operation may be simulated on the avionics digital twin by the verification engine 306.

At step 712, aircraft operational parameters corresponding to the first flight operation may be recorded. In an example, the aircraft operational parameters may be recorded by the verification engine 306.

At step 714, it may be ascertained that the corrective action mitigates the at least one potential flight safety incident. It may be ascertained that the corrective action mitigates the at least one potential flight safety incident upon determining that the at least one aircraft operational parameter is within the threshold ascertained. The corrective action mitigates the at least one potential flight safety incident may be ascertained by the verification engine 306.

In an example, the second machine learning model may be a reinforcement-based machine learning model. In the example, upon determining that the corrective action mitigates the at least one potential flight safety incident, the second machine learning model may be reward for identification of a corrective action that mitigates the at least one potential flight safety incident.

At step 716, the corrective action may be recommended for the at least one potential flight safety incident. In an example, the corrective action may be recommended by the verification engine 306.

In an example, recommending the corrective action may include computing flight operation characteristics associated with simulation of the first flight operation with the corrective action. The flight operation characteristics may include flight time, fuel consumption, and ATC approval confidence score corresponding to the flight operation, and the ATC approval confidence score is indicative of chances of approval of the flight operation by the ATC. The corrective action may then be rendered along with the flight operation characteristics.

FIGS. 8 and 9 illustrate methods 800 and 900 for optimizing flight safety operations for aircrafts, in accordance with examples of the present subject matter. The order in which the methods are described is not intended to be construed as a limitation, and any number of the described method blocks may be combined in any order to implement the methods, or an alternative method. Further, the methods 800 and 900 may be implemented by processing resource or computing device(s) through any suitable hardware, non-transitory machine-readable instructions, or combination thereof.

It may also be understood that methods 800 and 900 may be performed by programmed computing devices, such as the FSO system 102, as depicted in FIG. 4. Furthermore, the methods 800 and 900 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. The methods 800 and 900 are described below with reference to the FSO system 102, as described above; other suitable systems for the execution of these methods may also be utilized. Additionally, implementation of the method is not limited to such examples.

At block 802, aircraft operational parameters corresponding to a plurality of flight operations may be retrieved. The plurality of flight operations may correspond to an aircraft. The aircraft operational parameters may be retrieved from a Quick Access Recorder (QAR) database storing flight data for the plurality of flight operations. In an example, the aircraft operational parameters may be retrieved by the interaction engine 302.

At step 804, the aircraft operational parameters may be analyzed to identify a first flight operation from amongst the plurality of flight operations, where the first flight operation comprises at least one aircraft operational parameter with deviation beyond a threshold. The aircraft operational parameters may be analyzed using a first machine learning model, where the first machine learning model may be unsupervised machine learning model. In an example, the aircraft operational parameters may be analyzed by the analysis engine 304.

At step 806, at least one potential flight safety incident corresponding to the first flight operation may be identified. The at least one flight safety incident may be identified using the at least one aircraft operational parameter. In an example, the at least one potential flight safety incident may be identified by the analysis engine 304.

At step 808, the at least one potential flight safety incident may be analyzed to identify a plurality of corrective actions for the potential flight safety incident. The at least one potential flight safety incident may be analyzed using a second machine learning model, where the second machine learning model is trained using flight safety artifacts comprising a plurality of flight safety incidents and corrective actions to be initiated in response to the plurality of flight safety incidents. Examples of the flight safety artifacts include, but are not limited to, flight safety regulatory documents, aviation safety reports, flight data recording manuals, quick access recorders data frame layout, crew roaster, airline safety policies, flight data monitoring reports, and accident investigation reports. In an example, the at least one potential flight safety incident may be analyzed by the analysis engine 304.

At step 810, the plurality of corrective actions may be subjected to an avionics digital twin to ascertain that the plurality of corrective actions mitigates the at least one potential flight safety incident. In an example, the plurality of corrective actions may be subjected to the avionics digital twin by the verification engine 306.

At step 812, a first set of corrective actions from the plurality of corrective actions may be recommended for the at least one potential flight safety incident. In an example, the first set of corrective actions may be recommended by the verification engine 306.

FIG. 9 illustrates a method for identifying the first set of corrective actions from the plurality of corrective actions for mitigating the at least one potential flight safety incident, in accordance with an example of the present subject matter.

At block 902, the first flight operation may be simulated with each of the plurality of corrective actions on the avionics digital twin. In an example, the first flight operation may be simulated by the verification engine 306.

At block 904, aircraft operational parameters corresponding to the first flight operation simulated with each of the plurality of corrective actions may be recorded. In an example, the aircraft operational parameters may be recorded by the verification engine 306.

At block 906, it may be ascertained that the plurality of corrective action mitigates the at least one flight safety incident. In an example, it may be ascertained that the plurality of corrective actions mitigates the at least one potential flight safety incident when the deviation in the at least one aircraft operational parameter is found to be within the threshold for simulation of the first flight operation with each of the plurality of corrective actions. The plurality of corrective actions mitigates the at least one flight safety incident may be ascertained by the verification engine 306.

At block 908, a mitigation score may be assigned to each of the plurality of corrective actions, where mitigation score is indicative of the effectiveness of a corrective action in mitigating the at least one flight safety incident. In an example, the mitigation score may be assigned score may be assigned to each of the plurality of corrective actions by the verification engine 306.

At block 910, the first set of corrective actions with the mitigation score above a predetermined score may be identified from the plurality of corrective actions. In an example, the first set of corrective actions may be identified by the verification engine 306.

At block 912, the first set of corrective actions may be recommended for the at least one potential flight safety incident. In an example, the first set of corrective actions may be recommended by the verification engine 306.

Figure 10:
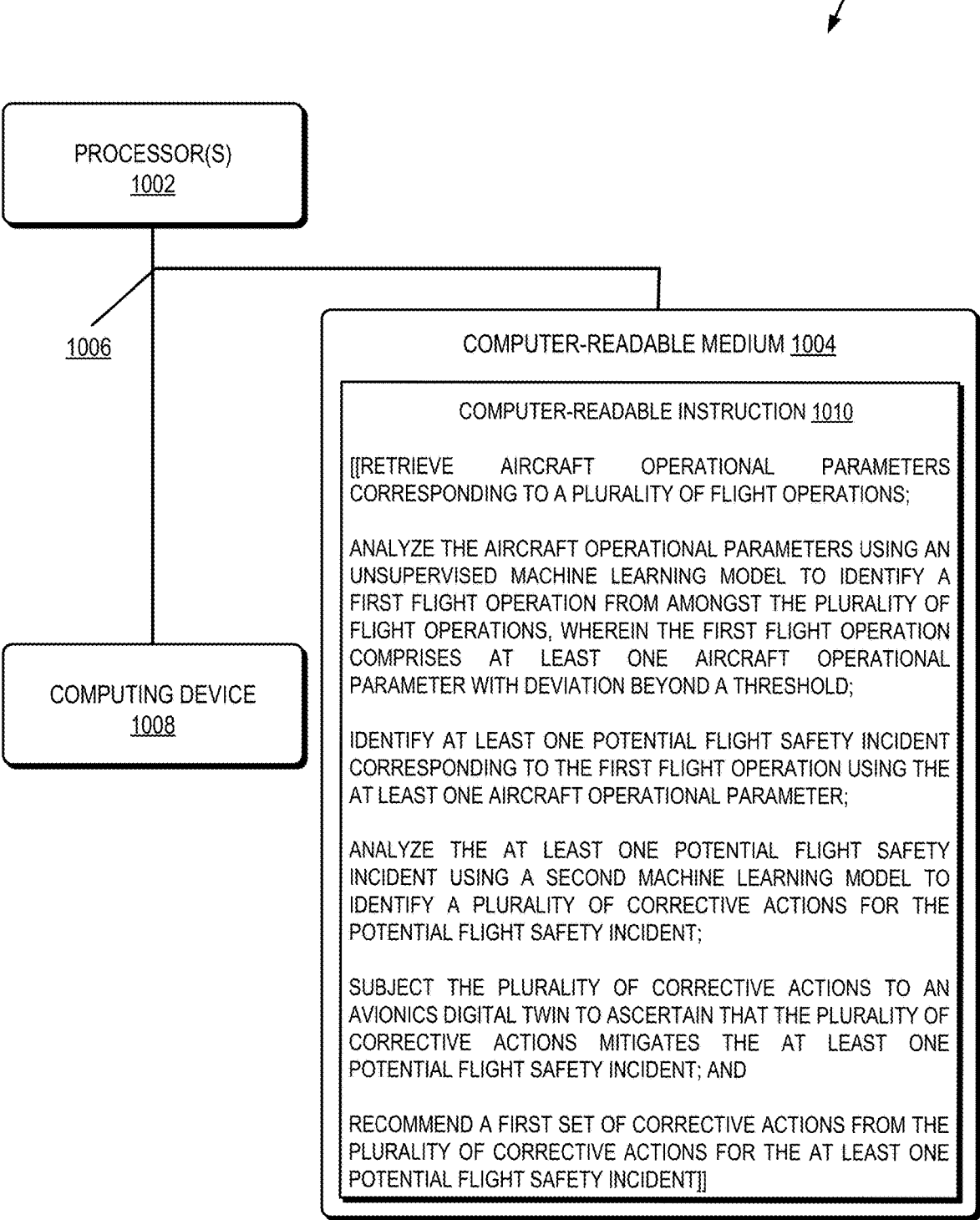
FIG. 10 illustrates a non-transitory computer-readable medium for optimizing flight safety operations for aircrafts, in accordance with an example of the present subject matter.

FIG. 10 illustrates a non-transitory computer-readable medium for optimizing flight safety operations for aircrafts, in accordance with an example of the present subject matter.

In an example, the computing environment 1000 includes processor 1002 communicatively coupled to a non-transitory computer readable medium 1004 through communication link 1006. In an example implementation, the computing environment 1000 may be for example, the FSO system 102. In an example, the processor 1002 may have one or more processing resources for fetching and executing computer-readable instructions from the non-transitory computer readable medium 1004. The processor 1002 and the non-transitory computer readable medium 1004 may be implemented, for example, in the FSO system 102.

The non-transitory computer readable medium 1004 may be, for example, an internal memory device or an external memory. In an example implementation, the communication link 1006 may be a network communication link, or other communication links, such as a PCI (Peripheral component interconnect) Express, USB-C (Universal Serial Bus Type-C) interfaces, I2C (Inter-Integrated Circuit) interfaces, etc. In an example implementation, the non-transitory computer readable medium 1004 includes a set of computer readable instructions 1010 which may be accessed by the processor 1002 through the communication link 1006 and subsequently executed for optimizing the flight safety operations. The processor(s) 1002 and the non-transitory computer readable medium 1004 may also be communicatively coupled to a computing device 1008 over the network.

Referring to FIG. 10, in an example, the non-transitory computer readable medium 1004 includes computer readable instructions 1010 that cause the processor 1002 to retrieve aircraft operational parameters corresponding to a plurality of flight operations. In an example, the aircraft operational parameters may be retrieved from a Quick Access Recorder (QAR) database storing flight data corresponding to the plurality of flight operations.

The computer readable instructions 1010 may then cause the processor 1002 to analyze the aircraft operational parameters using an unsupervised machine learning model to identify a first flight operation from amongst the plurality of flight operations, where the first flight operation comprises at least one aircraft operational parameter with deviation beyond a threshold. Examples of the unsupervised machine learning model may include, but are not limited to, Isolation Forest, Local Outlier Factor, Robust Covariance, One-class Support Vector Machine (SVM), and One-class SVM with Stochastic Gradient Descent (SGD).

Thereafter, the computer readable instructions 1010 may cause the processor 1002 to identify at least one potential flight safety incident corresponding to the first flight operation using the at least one aircraft operational parameter. The computer readable instructions 1010 may then cause the processor 1002 to analyze the at least one potential flight safety incident using a second machine learning model to identify a plurality of corrective actions for the potential flight safety incident. The second machine learning model may be trained using flight safety artifacts comprising a plurality of flight safety incidents and corrective actions to be initiated in response to the plurality of flight safety incidents. Examples of the flight safety artifacts may include, but are not limited to, flight safety regulatory documents, aviation safety reports, flight data recording manuals, quick access recorders data frame layout, crew roaster, airline safety policies, flight data monitoring reports, and accident investigation reports.

The computer readable instructions 1010 may then cause the processor 1002 to subject the plurality of corrective actions to an avionics digital twin to ascertain that the plurality of corrective actions mitigates the at least one potential flight safety incident. In an example, to subject the plurality of corrective actions to the avionics digital twin, the instructions may then cause the processor 1002 to simulate the first flight operation with each of the plurality of corrective actions on the avionics digital twin. The instructions 1010 may then cause the processor 1002 to record aircraft operational parameters corresponding to the first flight operation simulated with each of the plurality of corrective actions. Thereafter, the instructions 1010 may then cause the processor 1002 to ascertain if the plurality of corrective actions mitigates the at least one potential flight safety incident. In an example, the instructions 1010 may cause the processor 1002 to ascertain that the plurality of corrective actions mitigates the at least one potential flight safety incident if the deviation in the at least one aircraft operational parameter is found to be within the threshold for simulation of the first flight operation with each of the plurality of corrective actions.

In an example, the instructions 1010 may then cause the processor 1002 to assign a mitigation score to each of the plurality of corrective actions, where the mitigation score is indicative of the effectiveness of a corrective action in mitigating the at least one flight safety incident. Subsequently, the instructions 1010 may then cause the processor

1002 to identify a first set of corrective actions from the plurality of corrective actions with the mitigation score above a predetermined score.

The instructions 1010 may then cause the processor 1002 to recommend the first set of corrective actions from the plurality of corrective actions for the at least one potential flight safety incident.

In an example, the instructions 1010 may further cause the processor 1002 to compute the flight operation characteristics associated with simulation of the first flight operation with each of the plurality of corrective actions. The flight operation characteristics may include flight time, fuel consumption, and ATC approval confidence score corresponding to the flight operation, where the ATC approval confidence score is indicative of chances of approval of the flight operation by the ATC. In the example, the instructions 1010 may cause the processor 1002 to render the flight operation characteristics along with the plurality of corrective actions.

Although examples of the present subject matter have been described in language specific to methods and/or structural features, it is to be understood that the present subject matter is not limited to the specific methods or features described. Rather, the methods and specific features are disclosed and explained as examples of the present subject matter.

We claim:

1. A method for optimizing flight safety operations for an aircraft, comprising:

retrieving aircraft operational parameters corresponding to a plurality of flight operations;

analyzing the aircraft operational parameters using a first machine learning model to identify a first flight operation from amongst the plurality of flight operations, wherein the first flight operation comprises at least one aircraft operational parameter with deviation beyond a threshold;

identifying at least one potential flight safety incident corresponding to the first flight operation using the at least one aircraft operational parameter;

analyzing the at least one potential flight safety incident using a second machine learning model to identify a corrective action for the potential flight safety incident, wherein the second machine learning model is trained using flight safety artifacts comprising a plurality of flight safety incidents and corrective actions to be initiated in response to the plurality of flight safety incidents;

subjecting the corrective action to an avionics digital twin to ascertain that the corrective action mitigates the at least one potential flight safety incident; wherein subjecting the corrective action to the avionics digital twin comprises:

simulating the first flight operation with the corrective action on the avionics digital twin;

recording aircraft operational parameters corresponding to the first flight operation; and ascertaining that the corrective action mitigates the at least one potential flight safety incident upon determining the deviation in the at least one aircraft operational parameter to be within the threshold;

recommending the corrective action for the at least one potential flight safety incident;

computing flight operation characteristics associated with simulation of the first flight operation with the corrective action, wherein the flight operation characteristics comprise flight time, fuel consumption, and Air Traffic Control (ATC) approval confidence score corresponding to the flight operation, and the ATC approval confidence score is indicative of chances of approval of the flight operation by the ATC; and rendering the corrective action along with the flight operation characteristics.

2. The method of claim 1, wherein the aircraft operational parameters are retrieved from a Quick Access Recorder (QAR) database storing flight data for the plurality of flight operations.

3. The method of claim 1, wherein the first machine learning model is an unsupervised machine learning model.

4. The method of claim 1, wherein the second machine learning model is reinforcement-based machine learning model.

5. The method of claim 4, further comprising rewarding the second machine learning model upon ascertaining that the corrective action mitigates the at least one potential flight safety incident.

6. The method of claim 1, wherein the flight safety artifacts comprise at least one of flight safety regulatory documents, aviation safety reports, flight data recording manuals, quick access recorders data frame layout, crew roaster, airline safety policies, flight data monitoring reports, and accident investigation reports.

7. A Flight Safety Optimization (FSO) system comprising:

one or more processors; and a memory;

one or more programs stored in the memory, the one or more programs which, when executed by the one or more processors, cause the one or more processors to:

retrieve, by an interaction engine, aircraft operational parameters corresponding to a plurality of flight operations;

analyze, by an analysis engine coupled to the interaction engine, the aircraft operational parameters using a first machine learning model to identify a first flight operation from amongst the plurality of flight operations, wherein the first flight operation comprises at least one aircraft operational parameter with deviation beyond a threshold;

identify, by the analysis engine, at least one potential flight safety incident corresponding to the first flight operation using the at least one aircraft operational parameter; and analyze, by the analysis engine, the at least one potential flight safety incident using a second machine learning model to identify a corrective action for the potential flight safety incident, wherein the second machine learning model is trained using flight safety artifacts comprising a plurality of flight safety incidents and corrective actions to be initiated in response to the plurality of flight safety incidents; and simulate, by a verification engine coupled to the analysis engine, the first flight operation with the corrective action on an avionics digital twin;

record, by the verification engine, aircraft operational parameters corresponding to the first flight operation;

ascertain, by the verification engine, that the corrective action mitigates the at least one potential flight safety incident upon determining the deviation in the at least one aircraft operational parameter to be within the threshold;

recommend, by the verification engine, the corrective action for the at least one potential flight safety incident;

compute, by the verification engine, flight operation characteristics associated with simulation of the first flight operation with the corrective action, wherein the flight operation characteristics comprise flight time, fuel consumption, and ATC approval confidence score corresponding to the flight operation, and the ATC approval confidence score is indicative of chances of approval of the flight operation by the ATC; and render, by the verification engine, the flight operation characteristics along with the corrective action.

8. The FSO system of claim 7, wherein the aircraft operational parameters are retrieved from a Quick Access Recorder (QAR) database storing flight data for the plurality of flight operations.

9. The FSO system of claim 7, wherein the first machine learning model is an unsupervised machine learning model.

10. The FSO system of claim 7, wherein the second machine learning model is reinforcement-based machine learning model.

11. The FSO system of claim 7, wherein the one or more programs which, when executed by the one or more processors, cause the one or more processors to reward, the analysis engine, the second machine learning model upon ascertaining that the corrective action mitigates the at least one potential flight safety incident.

12. The FSO system of claim 7, wherein the flight safety artifacts comprise at least one of flight safety regulatory documents, aviation safety reports, flight data recording manuals, quick access recorders data frame layout, crew roaster, airline safety policies, flight data monitoring reports, and accident investigation reports.

13. A non-transitory computer readable medium comprising computer-readable instructions that when executed cause a processing resource of a computing device to:

retrieve aircraft operational parameters corresponding to a plurality of flight operations, wherein the aircraft operational parameters are retrieved from a Quick Access Recorder (QAR) database storing flight data corresponding to the plurality of flight operations;

analyze the aircraft operational parameters using an unsupervised machine learning model to identify a first flight operation from amongst the plurality of flight operations, wherein the first flight operation comprises at least one aircraft operational parameter with deviation beyond a threshold;

identify at least one potential flight safety incident corresponding to the first flight operation using the at least one aircraft operational parameter;

analyze the at least one potential flight safety incident using a second machine learning model to identify a plurality of corrective actions for the potential flight safety incident, wherein the second machine learning model is trained using flight safety artifacts comprising a plurality of flight safety incidents and corrective actions to be initiated in response to the plurality of flight safety incidents;

subject the plurality of corrective actions to an avionics digital twin to ascertain that the plurality of corrective actions mitigates the at least one potential flight safety incident;

wherein to subject the plurality of corrective actions to the avionics digital twin, the instructions cause the processing resource to:

simulate the first flight operation with each of the plurality of corrective actions on the avionics digital twin;

record aircraft operational parameters corresponding to the first flight operation simulated with each of the plurality of corrective actions;

ascertain that the plurality of corrective actions mitigates the at least one potential flight safety incident upon determining the deviation in the at least one aircraft operational parameter to be within the threshold for simulation of the first flight operation with each of the plurality of corrective actions;

recommend a first set of corrective actions from the plurality of corrective actions for the at least one potential flight safety incident;

compute flight operation characteristics associated with simulation of the first flight operation with each of the plurality of corrective actions, wherein the flight operation characteristics comprise flight time, fuel consumption, and ATC approval confidence score corresponding to the flight operation, and the ATC approval confidence score is indicative of chances of approval of the flight operation by the ATC; and render the flight operation characteristics along with the plurality of corrective actions.

14. The non-transitory computer readable medium of claim 13, further comprising:

assign a mitigation score to each of the plurality of corrective actions, where the mitigation score is indicative of effectiveness of a corrective action in mitigating the at least one flight safety incident; and identify the first set of corrective actions from the plurality of corrective actions with the mitigation score above a predetermined score.

15. The non-transitory computer readable medium of claim 13, wherein the flight safety artifacts comprise at least one of flight safety regulatory documents, aviation safety reports, flight data recording manuals, quick access recorders data frame layout, crew roaster, airline safety policies, flight data monitoring reports, and accident investigation reports.

* * * * *